(12) United States Patent
Zoppitelli et al.

(10) Patent No.: US 11,560,237 B2
(45) Date of Patent: Jan. 24, 2023

(54) METHOD FOR ASSISTING A SINGLE-ENGINE ROTORCRAFT DURING AN ENGINE FAILURE

(71) Applicant: AIRBUS HELICOPTERS, Marignane (FR)

(72) Inventors: Elio Zoppitelli, Cabries (FR); Michel Jamot, Aix en Provence (FR); Jeremy Camus, Ensues la Redonne (FR); Olivier Maegey, Aix en Provence (FR)

(73) Assignee: AIRBUS HELICOPTERS, Marignane (FR)

(*) Notice: Subject to any disclaimer, the term of this patent is extended or adjusted under 35 U.S.C. 154(b) by 706 days.

(21) Appl. No.: 16/704,456

(22) Filed: Dec. 5, 2019

(65) Prior Publication Data

US 2020/0277072 A1 Sep. 3, 2020

(30) Foreign Application Priority Data

Dec. 20, 2018 (FR) ..................... 1873625

(51) Int. Cl.
*B64D 31/12* (2006.01)
*B64F 5/60* (2017.01)
(Continued)

(52) U.S. Cl.
CPC .............. *B64D 31/12* (2013.01); *B60L 50/60* (2019.02); *B64C 27/006* (2013.01); *B64C 27/08* (2013.01);
(Continued)

(58) Field of Classification Search
CPC ........ B64D 31/12; B64D 27/02; B64D 27/10; B64D 27/24; B64D 35/04;
(Continued)

(56) References Cited

U.S. PATENT DOCUMENTS

| | | | |
|---|---|---|---|
| 3,455,182 A | 7/1969 | Kelley | |
| 4,500,966 A * | 2/1985 | Zagranski | B64C 27/006 |
| | | | 701/100 |

(Continued)

FOREIGN PATENT DOCUMENTS

| | | |
|---|---|---|
| EP | 2692634 A1 | 2/2014 |
| EP | 2778048 A1 | 9/2014 |

(Continued)

OTHER PUBLICATIONS

French Search Report for French Application No. FR 1873625, Completed by the French Patent Office, dated Oct. 30, 2019, 12 pages.

*Primary Examiner* — Muhammad Shafi
(74) *Attorney, Agent, or Firm* — Brooks Kushman P.C.

(57) ABSTRACT

An assistance method for assisting a pilot of a single-engined rotary-wing aircraft during a flight phase in autorotation, the aircraft including a hybrid power plant provided with a main engine, with an electric machine, with a main gearbox, and with an electrical energy storage device. The aircraft also includes a main rotor driven by the hybrid power plant. In the method, during a flight, operation of the main engine is monitored in order to detect a failure, in particular by means of a drop in power on the main rotor, then, when a failure of the main engine is detected, the electric machine is controlled to deliver auxiliary power We to the main rotor, making it possible to assist a pilot of the aircraft in performing the flight phase in autorotation following the failure.

23 Claims, 3 Drawing Sheets

(51) Int. Cl.
    *B60L 50/60* (2019.01)
    *B64C 27/08* (2006.01)
    *B64D 27/02* (2006.01)
    *B64D 27/10* (2006.01)
    *B64D 27/24* (2006.01)
    *B64D 35/04* (2006.01)
    *B64C 27/00* (2006.01)
    *H02P 1/46* (2006.01)
    *B64D 45/00* (2006.01)
    *H02P 101/30* (2015.01)

(52) U.S. Cl.
    CPC .............. *B64D 27/02* (2013.01); *B64D 27/10* (2013.01); *B64D 27/24* (2013.01); *B64D 35/04* (2013.01); *B64F 5/60* (2017.01); *H02P 1/46* (2013.01); *B60L 2200/10* (2013.01); *B64D 2027/026* (2013.01); *B64D 2045/0085* (2013.01); *H02P 2101/30* (2015.01)

(58) Field of Classification Search
    CPC ...... B64D 2027/026; B64D 2045/0085; B64D 31/00; B60L 50/60; B60L 2200/10; B64C 27/006; B64C 27/08; B64C 27/04; B64F 5/60; H02P 1/46; H02P 2101/30; Y02T 10/70; Y02T 50/60
    USPC ............................................................. 701/3
    See application file for complete search history.

(56) References Cited

U.S. PATENT DOCUMENTS

| | | | |
|---|---|---|---|
| 9,008,942 B2* | 4/2015 | Dyrla | B64D 35/02 701/99 |
| 9,387,934 B2* | 7/2016 | Gomez | B64C 27/12 |
| 2011/0121127 A1 | 5/2011 | Certain | |
| 2013/0204468 A1* | 8/2013 | Camhi | G05B 23/0283 701/100 |
| 2014/0054411 A1* | 2/2014 | Connaulte | B64D 27/24 244/17.13 |
| 2015/0176488 A1 | 6/2015 | Borchers et al. | |
| 2016/0260266 A1 | 9/2016 | Germanetti | |
| 2018/0155053 A1* | 6/2018 | Wang | B64C 13/34 |

FOREIGN PATENT DOCUMENTS

| | | |
|---|---|---|
| EP | 2886456 A1 | 6/2015 |
| EP | 3064437 A1 | 9/2016 |
| FR | 1560124 A | 3/1969 |
| FR | 2952907 A1 | 5/2011 |
| FR | 2994687 A1 | 2/2014 |

\* cited by examiner

METHOD FOR ASSISTING A SINGLE-ENGINE ROTORCRAFT DURING AN ENGINE FAILURE

CROSS-REFERENCE TO RELATED APPLICATIONS

This application claims priority to French patent application No. FR 18 73625 filed on Dec. 20, 2018, the disclosure of which is incorporated in its entirety by reference herein.

BACKGROUND OF THE INVENTION

(1) Field of the Invention

The present invention lies in the technical field of power plants of single-engined rotary-wing aircraft. The invention relates to an assistance method for assisting a single-engined rotary-wing aircraft during engine failure, and in particular for assisting in performing the flight phase in autorotation following the failure. The invention also relates to a single-engined rotary-wing aircraft provided with an assistance device for assisting during engine failure.

(2) Description of Related Art

A rotary-wing aircraft is conventionally provided with at least one main rotor for providing it with lift and possibly also with propulsion, and is generally also conventionally provided with a tail rotor, in particular for opposing the yaw torque that is exerted by the main rotor on the fuselage of the aircraft, or for also making it possible to control yaw movements of the aircraft as well as lateral flights.

In order to drive the main rotor and the tail rotor in rotation, the aircraft has a power plant that may include one or more main engines or motors, and generally one or more fuel-burning engines as its main engines. However, a power plant may optionally include one or more electric motors only as its main motors.

It should be noted that the terms "fuel-burning engine" and "engine" are used by convenience throughout this specification to mean turboshaft engines or piston engines that are suitable for use in such a power plant. The terms "fuel-burning engine" and "engine" are to be contrasted with the terms "electric motor" and "motor", which are used to designate motors driven by electrical power.

A distinction is drawn, in particular, between aircraft of the "single-engined" type, in which the power plant includes a single main engine for setting the main rotor and the tail rotor in motion, and aircraft of the "twin-engined" or "two-engined" type, in which the power plant has two main engines for that purpose.

Single-engined aircraft offer non-negligible advantages over aircraft provided with at least two fuel-burning engines. By way of example, mention may be made of reasonable cost, lower maintenance, and relatively low fuel consumption.

However, such single-engined aircraft also suffer from drawbacks.

In the event of a problem on or damage to the sole main engine, the power plant, and consequently the single-engined aircraft, has performance that is degraded, and that can, during a failure of the main engine, be degraded to the extent of incapacity to drive the main rotor and the tail rotor, thereby possibly giving rise to a dangerous situation, significantly increasing the workload on the pilot of the aircraft. During such a failure, since the main rotor is no longer driven by the power plant, the pilot must begin by going into a flight phase in autorotation, and must then make an emergency landing, with the main rotor rotating in autorotation.

A flight phase in autorotation corresponds to a special flight phase during which the aircraft flies, descending without any driving power, but at the cost of a rate of descent or "sink rate" that is rather large. The term "rate of descent" or "sink rate" means the amount of height the aircraft loses per unit time, with this loss of height generally being expressed in feet per minute (ft/min). For example, the rate of descent in autorotation for a single-engined aircraft is about 1500 ft/min.

In this situation, the main rotor is caused to rotate by the upward flow of air through it without a source of energy being available to enable the aircraft to remain fully maneuverable in particular by enabling any energy-consuming maneuver to take place. The main rotor, which is then driven in rotation by the relative wind, remains the seat of stabilized lift that is sufficient to brake the descent of the aircraft and to keep limited control of the aircraft, in particular in yawing, until it is landed.

However, the pilot, who has to apply this special piloting procedure, must be very attentive firstly to begin by going into an autorotation phase when the failure occurs, by rapidly lowering the collective pitch lever and by controlling the yaw movement of the aircraft, and secondly then to continue this maneuver that is always difficult until the aircraft is landed, by maintaining a speed of rotation of the main rotor within the allowable limits. In addition, the workload on the pilot increases for maneuvering the aircraft safely during this fight phase in autorotation, until an emergency landing is made in a suitable landing area. This special procedure requires great precision and appropriate and repeated practice by the pilot of the aircraft in training. It is a difficult part of piloting aircraft, in particular single-engined aircraft, and is one of the main reasons for the reduction in the flight envelope and in the use of this type of aircraft.

The flight envelope authorized for single-engined aircraft is reduced by the certification authorities that authorize flight. For example, it is forbidden to overfly a large city with a single-engined aircraft. Similarly, the capacities authorized for single-engined aircraft, such as maximum onboard weight, may be limited compared with their real capacities.

Solutions have been considered for assisting the pilot of a single-engined rotary-wing aircraft by providing additional energy for performing a flight phase in autorotation following a failure of the main engine.

In particular, Document FR 2 994 687 is known that discloses an assistance method and an assistance device comprising an electrical energy storage device and an electric machine driving the main gearbox of an aircraft in parallel with its main engine. In that method, during a flight, operation of the engine is monitored in order to detect failure thereof, in particular by monitoring for a drop in power on the main rotor, and then, in the event a failure of the engine is detected, the electric machine is controlled to deliver auxiliary power to the main rotor and to the auxiliary rotor, thereby enabling the pilot of the aircraft to be assisted in performing the flight phase in autorotation following the failure.

Document FR 1 560 124 is also known that discloses an assistance device comprising a main engine, an auxiliary engine and a clutch. The clutch enables the main rotor of the aircraft to be driven by its main engine only, jointly by both its main engine and the auxiliary engine of the assistance device, or else by the auxiliary engine only.

In addition, Documents EP 2 692 634 and EP 2 778 048 disclose systems making it possible to store energy during normal operation of an aircraft and to release the energy back again to drive the main rotor of the aircraft in the event of engine failure or indeed during critical flight phases. The energy may be stored in electrical form, hydraulic form, or indeed mechanical form.

Finally, Documents U.S. Pat. No. 9,008,942, EP 2 886 456, EP 3 064 437 and U.S. Pat. No. 4,500,966 are part of the technological background of the invention.

BRIEF SUMMARY OF THE INVENTION

An object of the present invention is thus to propose an assistance method for assisting a single-engined rotary-wing aircraft during a failure of the main engine of said aircraft. This method firstly makes it possible to detect such an engine failure earlier, and then to manage the engine failure safely by providing auxiliary power, in particular to reach the flight phase in autorotation and to make an emergency landing while limiting the speeds of impact of the aircraft with the ground, while the main rotor is rotating in autorotation.

The invention also advantageously enables the payload of the aircraft to be increased within a certain portion of the flight envelope by making it possible to increase the maximum weight authorized on takeoff of the aircraft. The invention makes it possible to comply with the certification requirements relating to engine failure when the maximum weight authorized on takeoff is increased, while preserving a safety level that is unchanged compared with the safety level demonstrated for the maximum weight initially defined for the aircraft, in particular with respect to the height-velocity envelope and to autorotation.

The invention provides an assistance method for assisting a single-engined rotary-wing aircraft in the event of engine failure, the method being designed for singe-engined rotary-wing aircraft including a hybrid power plant provided with a single main engine, with at least one electric machine, with a main gearbox, and with at least one electrical energy storage device powering the at least one electric machine. The aircraft also includes at least one main rotor driven in rotation during a flight at a nominal speed of rotation by said hybrid power plant.

The term "speed of rotation" of the main rotor of an aircraft is commonly used by the person skilled in the art to designate the frequency of rotation of the main rotor. This speed of rotation is then expressed in radians per second (rad/s) or indeed, more generally, in revolutions per minute (rpm).

Furthermore, during a flight, the main rotor of an aircraft rotates at a nominal speed of rotation, defined by the manufacturer of the aircraft, with a small amount of variation about the nominal speed of rotation nevertheless being possible.

Below, for simplification reasons, the term "speed of rotation" of the main rotor is used to mean the instantaneous speed of rotation of the main rotor, it being understood that, during a flight, this instantaneous speed of rotation is substantially equal to the nominal speed of rotation.

By default, an electric machine is a reversible machine. It can therefore operate in motor mode, i.e. such that the electric machine transforms electrical power into mechanical power, and it can also operate in generator mode, i.e. such that the electric machine transforms mechanical power into electrical power. Furthermore, the electric machine may, for example, be a brushless motor.

The electric machine may be placed in various positions within the hybrid power plant, as described in Document FR 2 952 907. For example, it may be connected to the main gearbox, to the main engine, or indeed directly to the main rotor of the aircraft.

This method is remarkable in that it includes the following steps:

an acquisition step for acquiring at least one monitoring parameter S for monitoring the aircraft in order to detect any failure of the main engine;

a monitoring step for activating at least one electric machine when at least one activation relationship containing instantaneous values of at least one monitoring parameter S and of its time derivative $$\frac{dS}{dt}$$

such as $$S + k_i \frac{dS}{dt}, \quad \text{[Math 1]}$$

is less than a dedicated activation threshold Threshold$_i$, so that:

$$S + k_i \frac{dS}{dt} < \text{Threshold}_i, \quad \text{[Math 2]}$$

where i is a positive integer varying from 1 to n, where n is a positive integer greater than or equal to 1, and where $k_i$ is a positive coefficient;

an assistance step for assisting in flying the aircraft, the at least one electric machine delivering auxiliary mechanical power We to the main rotor in regulated manner, thereby making it possible to assist the pilot of the aircraft during the flight phase following the failure of the main engine so that the pilot can maneuver the aircraft safely; and a deactivation step for deactivating the assistance step.

In the event of a failure of the main engine leading to total loss of power drive to the main rotor, the single-engined aircraft needs to be controlled by its pilot to go into a flight phase in autorotation, this flight phase being a flight phase in descent without driving power, with the aircraft remaining maneuverable, but without it enjoying all of the maneuverability available when the main engine is operating properly. Going into a flight phase in autorotation must be initiated by the pilot of the aircraft very quickly, within approximately 1 to 2 seconds of the main engine failure occurring, and it must be done using a special procedure that seeks to maintain the main rotor at a predetermined speed of rotation. If the pilot of the aircraft does not act rapidly following the failure, the speed of rotation of the main rotor of the aircraft decreases very quickly, causing a large reduction in its lift, and the aircraft then falls without any possibility of being maneuvered until it crashes.

Another critical instant following such a main engine failure is when landing the aircraft. Since the main rotor is rotating in autorotation, such landing also needs to be performed using a specific maneuver that is difficult for pilots to implement, in particular in order to avoid very rough contact with the ground. More precisely, at the end of the stabilized descent, the maneuver consists in raising the nose of the aircraft so as to reduce its forward speed and its descent speed, and then leveling the aircraft off again so as to touch the ground with an attitude that is substantially level, and in pulling on the collective pitch lever, at the right time, to soften the fall of the aircraft in the final phase of landing.

The method of the invention aims in particular to assist the pilot firstly in performing going into the flight phase in autorotation, and then in performing landing proper of the aircraft by delivering auxiliary mechanical power We to the main rotor.

At the time of the failure of the main engine, the main rotor is no longer driven by the main engine and the driving power drops to become zero. The driving power of the main rotor may be a monitoring parameter S representative of failure of the main engine. The rotation of the main rotor then undergoes considerable deceleration, and consequently its speed of rotation decreases progressively. The speed of rotation Nr of the main rotor may also be a monitoring parameter S representative of failure of the main engine.

A monitoring parameter S of the aircraft that makes it possible to detect a failure of the main engine may also be torque at the outlet of the main engine. In the event of a failure of the main engine, the driving power of said main engine drops rapidly, as does its torque.

When the main engine of the aircraft is a turboshaft engine having a compressor turbine, a monitoring parameter S may also be the speed of rotation of said compressor turbine. Since the compressor turbine is not connected mechanically to the free turbine of the main engine, its speed of rotation drops rapidly as soon as a failure occurs, and more rapidly than the speed of rotation of the main gearbox, which is connected mechanically to the free turbine of said engine and to the main rotor.

In addition, the speed of rotation of a shaft connected to the gas generator of the turboshaft engine may vary considerably, since the need for power varies very considerably depending on the flight phases of the aircraft. In particular, the speed of rotation of the shaft connected to the gas generator is compared with a minimum activation threshold authorized in an activation relationship. The minimum activation threshold is, in general, managed by an engine computer known as a "Full Authority Digital Engine Control" (FADEC) or indeed any other system designed to avoid a flameout of the turboshaft engine.

It is also possible, as a monitoring parameter S, to use one or more operating characteristics of the main engine when said main engine is a fuel-burning engine, such as the temperatures and the pressures of the fluids in the engine, for example. Variation in such operating characteristics of the main engine can make it possible to identify that a failure of said main engine is going to occur soon.

The instantaneous value of any monitoring parameter S whatsoever can be obtained by a measurement device that is dedicated or indeed shared with instruments or other systems of the aircraft.

The method of the invention thus, during the acquisition step, acquires at least one monitoring parameter S and its time derivative. This acquisition step is performed throughout the assistance method of the invention, both during the flight proper of the aircraft, and also while the aircraft is on the ground, waiting to take off or indeed after it has landed.

Then, at least one activation relationship [Math 1] containing the instantaneous values of at least one monitoring parameter S and of its time derivative is compared with an activation threshold $Threshold_i$ dedicated to said monitoring parameter S, where i is a positive integer varying from 1 to n, where n is a positive integer greater than or equal to 1, and $k_i$ is a positive coefficient.

During the monitoring step, a failure of the main engine of the aircraft is thus considered as being detected as soon as at least one activation relationship [Math 1] is less than an activation threshold $Threshold_i$ dedicated to said monitoring parameter S and to said activation relationship and leads to activation of at least one electric machine. The coefficient $k_i$ is chosen in such a manner as to prefer the value of the monitoring parameter S or indeed the value of its derivative in comparing an activation relationship with an activation threshold $Threshold_i$ and, therefore, in detecting a failure of the main engine.

The activation threshold $Threshold_i$ and the coefficient $k_i$ are coefficients that are dependent on the aircraft. The activation threshold $Threshold_i$ also depends on the coefficient $k_i$ that is chosen, the value of the activation threshold $Threshold_i$ decreasing when the value of the coefficient $k_i$ increases.

The coefficient $k_i$ makes it possible to weight the influence of the derivative relative to the monitoring parameter S on the result of the activation relationship. The value of an activation threshold $Threshold_i$ is chosen in order to obtain a compromise or trade-off between reactivity in detecting the failure and limiting the risk of false failure detection. However, the value of an activation threshold Thresholds may be chosen in such a manner as to prefer high reactivity in detecting the failure or indeed as to minimize the risk of false failure detection. For example, the coefficient $k_i$ lies in the range 3 to 5 for said activation relationship.

For example, the values of the activation thresholds $Threshold_i$ and of the coefficients $k_i$ may be determined by numerical simulations and/or by in-flight testing.

Advantageously, the use of the time derivative of a monitoring parameter S makes it possible to anticipate detection of a failure of the main engine. Following a failure of the main engine of the aircraft, a monitoring parameter S varies, but its time derivative, characterizing its rate of variation, varies more widely and more rapidly.

In addition, the simultaneous use of instantaneous values of at least one monitoring parameter S and of its time derivative makes it possible to detect effectively and as early as possible a failure of the main engine of the aircraft, while also limiting the risk of erroneously detecting a failure that does not exist.

Preferably, the method of the invention uses a single monitoring parameter S. However, simultaneous use of a plurality of monitoring parameters S may be envisaged.

A preferred monitoring parameter S in the method of the invention is the speed of rotation Nr of the main rotor. For this parameter, the method compares at least one activation relationship containing the instantaneous values of the speed of rotation Nr of the main rotor and of its time derivative $$\frac{dNr}{dt}$$

with a dedicated activation threshold $Threshold_i$, such as $$Nr + k_i \frac{dNr}{dt}. \qquad \text{[Math 3]}$$

For example, when a monitoring parameter S is the speed of rotation Nr of the main rotor, an activation threshold $Threshold_i$ may lie in the range 90% to 95% of a nominal speed of rotation of the main rotor for a coefficient $k_i$ equal to 3, and an activation threshold $Threshold_i$ may lie in the range 85% to 90% of said nominal speed of rotation of the main rotor for a coefficient $k_i$ equal to 5.

A failure of the main engine of the aircraft is then considered as being detected as soon as at least one such activation relationship is less than a dedicated activation threshold $Threshold_1$, such as:

$$Nr + k_i \frac{dNr}{dt} < Threshold_i. \qquad \text{[Math 4]}$$

Furthermore, following the flight phase during which the failure of the main engine occurs, the variation of the monitoring parameter S and/or of its time derivative is different, and indeed can be very different. For example, if the failure of the main engine happens during a hovering flight phase during which the main rotor requires a large amount of power, the value of a monitoring parameter S, and in particular the speed of rotation Nr of the main rotor, may drop much more rapidly than if such a failure occurred during a cruising flight phase at a moderate forward speed, and in particular at the economical cruising speed.

Consequently, the method of the invention preferably compares at least two activation relationships containing the instantaneous values of a monitoring parameter S and of its time derivative with a dedicated activation threshold $Threshold_i$, such as:

$$S + k_i \frac{dS}{dt} < Threshold_i, \qquad \text{[Math 2]}$$

where i is a positive integer varying from 1 to n, where n is a positive integer greater than or equal to 2, and where $k_i$ is a positive coefficient.

In which case, the activation threshold Thresholds and the coefficient $k_i$ are preferably predetermined coefficients that are dependent on the aircraft and that are constant for any given aircraft. The activation thresholds $Threshold_i$ and the coefficients $k_i$ can thus be adapted to the various flight situations. For example, a high coefficient $k_i$ is reactive for failures in which there is a severe drop in the speed of rotation of the rotor that is used as the monitoring parameter S, but is inappropriate for the other situations.

However, the method of the invention may use a single activation relationship, such as $$S + k \frac{dS}{dt} < Threshold, \qquad \text{[Math 5]}$$

the positive coefficient k then being variable as a function of the monitoring parameter S and of its time derivative in order to take into account the various flight phases. As for the activation threshold Threshold, it is predetermined for any given aircraft. This activation threshold Threshold may be constant or indeed be variable as a function of the positive coefficient k and optionally of the monitoring parameter S and of its derivative.

Furthermore, the values of a monitoring parameter S are preferably obtained on the basis of pieces of information that are not noisy and that are finely sampled in order to enable the method of the invention to detect a failure of the main engine regardless of the flight phase in reliable and reactive manner. For that purpose, each measurement device is preferably independent and dedicated to the method. Noise, coming, for example, from the measurement device itself, from the data transmission system or from the digital acquisition system, in particular due to electromagnetic disturbances, can be filtered out and the derivative can be computed using any simple, robust, and rapid algorithm. For example a first-order filter and a computation of the derivative by using Euler's formula, gives the method of the invention good reactivity.

It may however be advantageous in this situation to use a monitoring parameter S that is refreshed at a high frequency in order to limit the delay that might be induced by such a filter.

In addition, when a monitoring parameter S is the speed of rotation Nr of the main rotor, the measurement device dedicated to said monitoring parameter S preferably measures a speed of rotation of a gearwheel of the main gearbox of the hybrid power plant driving the main rotor in rotation, which gearwheel is synchronous with the main rotor, i.e. the speeds of rotation of the gearwheel and of the main rotor are mutually proportional, and said gearwheel has a speed of rotation that is considerably greater than the speed of rotation of the main rotor.

In this way, the information about the speed of rotation of the main rotor is more accurate and with finer sampling than with a direct measurement on the hub of the main rotor. This fineness of the information is essential in order to limit appearance of noise considerably, and consequently avoid any untimely triggering, while also enabling a failure to be detected within a shorter detection time. Such noise is even more harmful since it is amplified in the control law by the same coefficient k that is applied to the derivative of the monitoring parameter. This may increase the risk of untimely activation.

In addition, the use of filtering of the information about the speed of rotation of the main rotor is then not systematically necessary, advantageously enabling the method of the invention to be more reactive in detecting engine failure. The absence of such filtering of the information avoids introducing a slight delay that is potentially induced by such filtering in processing the information.

For example, the speed of rotation of the gearwheel is of the order of 6000 rpm whereas the speed of rotation of the main rotor lies in the range 300 rpm to 400 rpm.

Then, during the monitoring step, at least one electric machine is activated when a failure of the main engine is detected via at least one above-mentioned activation relationship [Math 2]. At least one electric machine is then available for driving the main gearbox in order to deliver mechanical power to the main rotor as soon as the situation so requires.

Furthermore, each electric machine is preferably connected to the main gearbox via a coupling device, e.g. via a clutch or indeed a freewheel.

In addition, at least one electrical energy storage device may also be activated during the monitoring step if that is necessary, in order to deliver electric current when a failure of the main engine is detected.

Certain electrical energy storage devices, such as a battery or a supercapacitor, which is a capacitor capable of delivering high power in a limited time, can deliver a flow of electrical energy as soon as they are solicited or indeed as soon as they are activated, thereby enabling an electric machine to deliver mechanical energy to the main rotor substantially as of activation of said electric machine, i.e. as soon as a failure is detected.

Conversely, other electrical energy storage devices, such as fuel cell, require non-negligible trigger times $\Delta t$ between being activated and actually delivering electric current. In such a situation, the trigger time $\Delta t$ must be taken into account in the detection of the failure of the main engine of the aircraft so that each electric machine can deliver mechanical energy to the main rotor as early as possible.

The activation threshold $\text{Threshold}_i$ with which each activation relationship [Math 1] is compared is then preferably replaced with a trigger threshold $\text{Threshold}'_i$ taking into account the trigger time $\Delta t$ for triggering the electrical energy storage device, such as:

$$\text{Threshold}'_i = \text{Threshold}_i - \frac{dS}{dt} \cdot \Delta t. \qquad \text{[Math 6]}$$

In this way, detecting the failure is advantageously anticipated so that the electrical energy storage device is activated sufficiently early for each electric machine to be electrically powered and to deliver mechanical energy to the main rotor within the time required for performing the phase in autorotation.

Then, after the failure of the main engine of the aircraft has been detected and after at least one electric machine has been activated, the at least one electric machine is controlled, during the assistance step for assisting in flying the aircraft, to operate in motor operating mode, i.e. in such a manner that the electric machine can deliver auxiliary mechanical power We to the main rotor. This delivery of auxiliary mechanical power We then makes it possible to reduce the deceleration of the main rotor. The drop in the speed of rotation of the main rotor is then less rapid, enabling the pilot to have more flexibility in the maneuver for recovering this speed of rotation of the main rotor. The aircraft going into the flight phase in autorotation is then quicker and easier for the pilot. In addition, this delivery of auxiliary mechanical power We also makes it possible to increase the time available for the pilot of the aircraft for initiating going into the flight phase in autorotation by a few seconds, e.g. by from 1 to 2 seconds.

In addition, during landing of the aircraft, in order to reduce, or indeed to stop the descent speed and the forward speed of the aircraft, the maneuver for leveling off again must be accompanied by an increase in the collective pitch of the blades of the main rotor, performed by the pilot, which, by delivering very temporary additional lift causes a very rapid drop in the speed of rotation of said main rotor. In the short time for leveling off again and for applying collective pitch, the power necessary for the flight increases and the only source of energy for the main rotor is its own kinetic energy in rotation.

The method of the invention makes it possible, at that instant, also to deliver auxiliary mechanical power We making it possible to increase the quantity of kinetic energy available at the main rotor, and, consequently, the quantity of energy available for reducing the descent speed and the forward speed of the aircraft. The pilot can therefore have additional energy available for making a landing without any rough impact with the ground and while limiting the slip of the aircraft over the ground. The pilot must, as a priority, reduce the descent speed of the aircraft to make a landing without impact, slipping of the aircraft on landing, due to non-zero forward speed, being less critical.

Finally, during the descent in autorotation, the pilot may also request additional lift from the main rotor in order to maneuver the aircraft, in particular for avoiding an obstacle or indeed for reaching a suitable landing ground. This request for additional lift at the main rotor is also accompanied by a reduction in the power available to the main rotor, and, consequently, by a reduction in its speed of rotation. The method then detects this reduction in the speed of rotation of the main rotor, and then controls the electric machine to operate in motor operating mode so as to deliver auxiliary mechanical power We to the main rotor. This auxiliary power We delivered to the main rotor makes it possible to perform the maneuver requested by the pilot and to maintain the speed of rotation of the main rotor at the value required in the phase in autorotation, also making it possible to reduce the rate of descent of the aircraft.

During the assistance step for assisting in flying the aircraft, at least one electric machine preferably operates in regulated manner so as to drive the main rotor in rotation until the aircraft has landed.

For example, each electric machine can deliver maximum power with a limitation on the electric current consumed by each electric machine, a magnitude of the electric current being less than a predetermined limit value.

At least one electric machine may also deliver a first predetermined amount of auxiliary power to the main rotor for a first predetermined lapse of time for going into the phase in autorotation of the main rotor, and a second predetermined amount of auxiliary power to the main rotor at the time landing the aircraft takes place.

During the assistance step for assisting in flying the aircraft, at least one electric machine may also deliver firstly constant torque until it delivers auxiliary mechanical power We equal to a predetermined nominal amount of power, and then at least one electric machine delivers auxiliary mechanical power We equal to the predetermined nominal amount of power until at least one monitoring parameter S reaches a threshold value. At least one electric machine is then regulated so as to maintain a monitoring parameter S equal to the threshold value. The threshold value may be equal to a characteristic functional value of the aircraft, and optionally take into account a safety margin.

When the monitoring parameter S is the speed of rotation Nr of the main rotor, the threshold value is equal to a predetermined threshold speed of rotation of the main rotor. This predetermined threshold speed of rotation is, for example, equal to the nominal speed of rotation of the main rotor. Said predetermined threshold speed of rotation may also be greater than said nominal speed of rotation, and, for example, be equal to 105% of the nominal speed of rotation. However, the predetermined threshold speed of rotation should preferably be less than a maximum speed of rotation of the main rotor that is referred to as "overspeed" and that, for example, is equal to 111% of the nominal speed of rotation. This maximum speed of rotation corresponds to the maximum limit for the speed of rotation Nr of the main rotor that is permitted without giving rise to damage to the mechanical portions of the main rotor and/or of the tail rotor, in particular for the portions sensitive to centrifugal force. This maximum limit may also be established for dynamic considerations regarding the mechanical transmission systems.

During the assistance step for assisting in flying the aircraft, each electric machine may also be regulated by using a threshold value as the only setpoint for a monitoring parameter S so as to maintain said monitoring parameter S equal to the threshold value.

During the assistance step for assisting in flying the aircraft, each electric machine may also be regulated by using a setpoint on the power delivered by the electric machine. This power delivered by at least one electric machine is, for example, equal to its maximum power, while also being limited by the maximum torque that each electric machine can deliver. This limitation in torque makes it possible to prevent an electric current that is too high from passing through at least one electric machine, thereby preventing it from being damaged.

During the assistance step for assisting in flying the aircraft, each electric machine may also be regulated by using a setpoint on the torque delivered by the electric machine. Such a torque setpoint may, in addition, be a function of the monitoring parameter S and of its derivative.

For example, when the monitoring parameter S is the speed of rotation Nr of the main rotor, the torque delivered by at least one electric machine may be high when the deceleration of the speed of rotation Nr of the main rotor is high, or when the speed of rotation Nr is low. In particular, when the derivative of the speed of rotation Nr is less than −15 revolutions per minute per second (−15 rpm/s) or indeed when the speed of rotation Nr is less than 85% of the nominal speed of rotation of the main rotor, each electric machine may be regulated using a setpoint equal to its nominal torque in order to react rapidly to the decrease in the speed of rotation Nr of the main rotor.

Conversely, the torque delivered by at least one electric machine may be less high when the deceleration of the speed of rotation Nr of the main rotor is moderate or indeed when the speed of rotation Nr is not too low. In particular, when the derivative of the speed of rotation Nr is greater than −15 rpm/s or when the speed of rotation Nr is greater than 85% of the nominal speed of rotation of the main rotor, each electric machine may be regulated using a setpoint less than its nominal torque, and typically lying in the range 50% to 80% of said nominal torque. The use of lower torque thus advantageously makes it possible to limit the use of the electrical energy stored in each electrical energy storage device.

Furthermore, when the engine failure occurs in the proximity of the ground, the speed of reaction is essential for avoiding a crash. In such a situation, it is possible for at least one electric machine to deliver its maximum power as of being activated and until the aircraft has landed. This applies in particular when the aircraft is in the vicinity of the low limit of a diagram that is characteristic of the aircraft and that is known as the "height-velocity diagram". This low limit is delimited by the "low point" and by the "knee" point. The height-velocity diagram is specific to each aircraft, and it depends on the weight of the aircraft and on the atmospheric conditions. As a function of the horizontal speed, it determines the limit values for "height above ground" beyond which limit values, in the event of engine failure, safe landing in autorotation is not guaranteed.

The "height above ground" of an aircraft is its position relative to the ground along a vertical axis. This term "height above ground" is more appropriate than "altitude" which defines the position of the aircraft along said vertical axis, but does so relative to sea level. Thus, the height above ground defines the space available between the aircraft and the ground, and that is necessary, for example, for going into a flight phase in autorotation and for landing following a failure.

The method of the invention thus advantageously makes it possible to facilitate landing the aircraft following a failure of the main engine occurring in an area close to the low portion of the height-velocity envelope, delimited by the low point, corresponding to a failure occurring during hovering flight, and by the "knee" point.

Finally, the deactivation step for deactivating the assistance step makes it possible to stop delivering the auxiliary mechanical power We to the main rotor via at least one electric machine. This deactivation step thus advantageously makes it possible to save electrical energy stored in the at least one electrical energy storage device powering at least one electric machine when it is no longer necessary to deliver the auxiliary mechanical power We to the main rotor.

This deactivation step may use a deactivation relationship that involves at least one monitoring parameter S and optionally its derivative. However, this deactivation relationship is different from each activation relationship used, thereby advantageously avoiding successive deactivations and activations. Using a common relationship during the monitoring step and during the deactivation step may give rise to untimely deactivation of the assistance step rapidly after the delivery of auxiliary mechanical power We following a reduction in the speed of decrease of the monitoring parameter S used, corresponding to the derivative of said monitoring parameter S, without the value of the monitoring parameter S having increased significantly and having reached a sufficient value.

The method of the invention thus uses asymmetric relationships during the monitoring and the deactivation steps.

For example, a deactivation relationship can make it possible to compare a monitoring parameter S used with a deactivation threshold, the assistance step being deactivated as soon as the monitoring parameter S used is greater than or equal to said deactivation threshold. In this way, as soon as the monitoring parameter S used has reached or exceeded the deactivation threshold, flying the aircraft in autorotation can be performed without delivering auxiliary mechanical power We in spite of the detected engine failure. Delivery of auxiliary mechanical power We can therefore be stopped, thereby advantageously saving electrical energy stored in at least one electrical energy storage device powering at least one electric machine delivering said auxiliary mechanical power We.

A deactivation relationship may also contain a monitoring parameter S used and its derivative, and be compared with a deactivation threshold Threshold$_{Max}$, the assistance step being deactivated as soon as the deactivation relationship is greater than or equal to said deactivation threshold Threshold$_{Max}$. Such a deactivation relationship can then be written:

$$S + k'\frac{dS}{dt} \geq Threshold_{Max}. \qquad \text{[Math 7]}$$

The coefficient k' may be constant or indeed variable as a function of the monitoring parameter S used and of its derivative. For example, the coefficient k' may lie in the range 1 to 3 in the context of the deactivation relationship.

Stopping this delivery of auxiliary mechanical power We also makes it possible to prevent the monitoring parameter S used from reaching a value greater than a maximum limit that could give rise to damage to the aircraft. In addition, using the derivative in the deactivation relationship can make it possible to take into account a delay between the deactivation order for deactivating the assistance step and the actual stopping of the delivery of the auxiliary mechanical power We to the main rotor, thereby anticipating the monitoring parameter S reaching said maximum limit, and advantageously preventing the monitoring parameter from going beyond said limit.

When the monitoring parameter S used is the speed of rotation Nr of the main rotor, the deactivation threshold is, for example, equal to the nominal speed of rotation of the main rotor. This deactivation threshold may also be greater than said nominal speed of rotation, and, for example, be equal to 105% of the nominal speed of rotation. However, the deactivation threshold should preferably be less than a maximum speed of rotation of the main rotor that is referred to as "overspeed" and that, for example, is equal to 111% of the nominal speed of rotation.

In addition, the pilot of the aircraft may choose to stop the delivery of auxiliary mechanical power We by each electric machine by intentionally deactivating the assistance step. The pilot then actuates a control, e.g. takes action on a button present on the instrument panel of the aircraft or indeed on a touch screen arranged on the instrument panel, in order to deactivate the assistance step.

The pilot of the aircraft can stop the delivery of the auxiliary mechanical power We when the pilot deems it is no longer necessary, e.g. when the main engine has started again, with the failure having been only temporary, or indeed once the flight in autorotation is taking place, in order to save electrical energy stored in each electrical energy storage device.

The pilot of the aircraft can stop the delivery of the auxiliary mechanical power We following display of an alarm informing the crew of the aircraft of a particular event. The alarm may, for example, report significant overheating of or damage to an electric machine. The pilot can then, depending on the circumstances, choose to continue using the electric machine at the risk of damaging it to a considerable extent or indeed of destroying it, if possible by adapting the piloting, typically by lowering the collective pitch lever in order to help perform the flight in autorotation. The pilot may also choose to stop using the electric machine by stopping the delivery of the auxiliary mechanical power We in order to preserve said electric machine and in order to keep it operational, e.g. for landing the aircraft.

In addition, the assistance step may be activated following a special maneuver by the pilot of the aircraft causing, for example, a rapid and large drop in a monitoring parameter S even though no engine failure is present. The pilot of the aircraft can then rapidly deactivate the assistance step in order to limit the consumption of the electrical energy stored in each electrical energy storage device. Otherwise, the delivery of the auxiliary mechanical power We can advantageously enable the monitoring parameter S to return rapidly to a nominal value or close to said nominal value, thereby improving the safety of the aircraft accordingly.

This applies, for example, following a sudden increase in the collective pitch of the blades of the main rotor of the aircraft that causes a rapid and large drop in the speed of rotation Nr of the main rotor. The main engine is capable, on its own, of bringing the main rotor back to a speed of rotation Nr close to or equal to a nominal speed of rotation of said main rotor without the safety of the aircraft being called into question. However, the assistance step of the method of the invention makes it possible, by delivering auxiliary mechanical power We, to facilitate increasing the speed of rotation Nr of the main rotor and to limit the time taken for it to reach the nominal speed of rotation.

Furthermore, the method of the invention may include at least one inhibition condition preventing the monitoring step from being performed when one or more conditions are satisfied.

For example, the monitoring step of the method of the invention should not be triggered when the aircraft is on the ground. On the ground, the main rotor of the aircraft can be turning slowly or idling, i.e. turning at a speed of rotation lower than the nominal speed. This idling speed of rotation could be identified as a drop in power on the main rotor and consequently as a failure of the main engine. To eliminate this possibility, it is then advantageous to use a first piece of information, delivered by an information system present on the aircraft, indicating that the aircraft is on the ground or indeed that it has taken off, so as to be sure that the main rotor has reached the nominal speed of rotation and so as to enable the monitoring step to be performed if necessary.

Thus, a first inhibition condition is said first piece of information indicating that the aircraft is on the ground. This first piece of information indicating that the aircraft is on the ground may be delivered by a sensor present in the undercarriage by detecting that the undercarriage is bearing against the ground. This first piece of information may also be the height of the aircraft relative to the ground as delivered, for example, by a radio altimeter and having a value that is not varying and that is less than or equal to a predefined height, e.g. 1 meter, when the aircraft is on the ground.

This piece of information indicating the aircraft is on the ground may also be obtained via monitoring of the speed of rotation Nr of the main rotor. When the main rotor is stopped or is rotating at a very low speed, the aircraft is necessarily on the ground. Therefore, in order to avoid untimely triggering of the electric machine, a second inhibition condition is a first inhibition threshold preventing the monitoring step from being performed when the speed of rotation Nr of the main rotor is less than said first inhibition threshold. For example, this first inhibition threshold may be equal to 65% of the nominal speed of the main rotor.

In addition, it is necessary not to trigger the method of the invention during special flight phases that are requested by the pilot of the aircraft and that are demanding in terms of aerodynamic loads. In particular, when the pilot requests a large increase in the collective pitch of the blades of the main rotor, a decrease in the speed of rotation Nr of the main rotor can occur under the effect of such aerodynamic loads before the main engine can re-establish the nominal speed of rotation of said main rotor.

In such a situation, the activation relationship [Math 1] combining a monitoring parameter S and its time derivative can be less than the corresponding activation threshold, in particular when the monitoring parameter S is the speed of rotation Nr.

The decrease in the speed of rotation Nr of the main rotor can be accompanied by values of the derivative leading to an activation relationship [Math 3] being less than the activation threshold Thresholds even though the main engine is not suffering from any failure. In this situation, the speed of rotation Nr generally remains greater than a predetermined speed of rotation. A third inhibition condition can then be that a monitoring parameter S is greater than a second inhibition threshold, in particular that the speed of rotation Nr is greater than an inhibition speed. For example, the inhibition speed is equal to the nominal speed of the main rotor or indeed is greater than the nominal speed of the main rotor.

Similarly, this decrease in the speed of rotation Nr of the main rotor may be a low speed of rotation Nr so that the activation relationship [Math 3] is less than the activation threshold Thresholds even though the main engine is not suffering from any failure. For example, the speed of rotation Nr has decreased following a large increase in the collective pitch of the blades of the main rotor, but the main engine then enables this speed of rotation Nr to increase so as to come back towards the nominal speed. The derivative of the speed of rotation Nr is then positive, or indeed very high, when the main engine of the aircraft delivers a large amount of power to the main rotor. The derivative of the speed of rotation Nr then lies in a range of known values. A fourth inhibition condition may then be that the derivative of a monitoring parameter S, and in particular the derivative of the speed of rotation Nr, lies in a predetermined inhibition range.

In addition, above a certain minimum height above the ground, hovering flights are very rare so that going into the phase in autorotation is facilitated, since the aircraft has a non-zero forward speed. Thus, the method of the invention may be operational only below said minimum height above ground. A fifth inhibition condition is then that the aircraft is flying above said minimum height above the ground. For example, the minimum height above the ground is equal to 2000 meters.

Finally, when training a pilot, in particular when training a pilot in going into flight in autorotation, it is necessary for the assistance step not to be activated when an engine failure is simulated. To this end, the instructor acts on a button present on the instrument panel of the aircraft or indeed on a touch screen arranged on the instrument panel to indicate that it is a training flight. A sixth inhibition condition is thus action on said button or on said touch screen arranged on the instrument panel.

To sum up, an inhibition condition for preventing the monitoring step from being performed may be chosen from among the following list:
- the aircraft is on the ground;
- the speed of rotation Nr of the main rotor is less than a first inhibition threshold;
- the aircraft is above a predetermined height above the ground;
- the aircraft is on a training flight;
- the undercarriage is detected as bearing against the ground;
- the value delivered by a radio altimeter is not varying and is less than or equal to a predefined height;
- a monitoring parameter S is greater than a second inhibition threshold: e.g. the speed of rotation Nr of the main rotor is greater than an inhibition speed; and
- the derivative of a monitoring parameter S, and in particular the derivative of the speed of rotation Nr, lies in a predetermined inhibition range.

Naturally, other inhibition conditions for inhibiting the monitoring step or indeed for preventing the method of the invention from being performed may be considered.

However, once the monitoring step has been performed following detection of an engine failure, these inhibition conditions have no effect on the method and the electric machine delivers the auxiliary power We required to the main rotor depending on the maneuvers requested by the pilot.

The method of the invention may also include a pre-activation step, performed before the monitoring step. This pre-activation step makes it possible, for example, to bring the method of the invention out of a dormant state, and to place it in a standby state.

A first pre-activation criterion applied during this pre-activation step may be associated with one or more monitoring parameters S for monitoring the aircraft. A pre-activation criterion is, for example, a speed of rotation Nr of the main rotor greater than the inhibition speed. The method is thus in said dormant state when the main rotor is stopped or indeed is turning at a speed of rotation Nr less than the inhibition speed. The method goes into a standby state as soon as the main rotor is turning at a speed of rotation Nr greater than the inhibition speed.

A second pre-activation criterion may also be the first piece of information indicating that the aircraft is no longer on the ground. The first piece of information may be delivered, as mentioned above, by a sensor present in the undercarriage or indeed by a radio altimeter.

It can be observed that these first and second pre-activation criteria are pieces of information that are respectively opposite from the first and second inhibition conditions. For example, if the first pre-activation criterion is satisfied, the first inhibition condition is not satisfied. The use of the pre-activation step and of these pre-activation criteria thus makes it possible to remove the first and second inhibition criteria from the inhibition criteria for inhibiting the assistance step.

Inhibition criteria for inhibiting the pre-activation step may also be applied in order to stay in the dormant state and in order not to go into the standby state even though the pre-activation step is validated. For example, an inhibition criterion applied during the pre-activation step may be a piece of information that a maintenance operation is in progress on the aircraft. Another inhibition criterion for inhibiting the pre-activation step may be that the aircraft has just landed and that its mission is finished.

Another inhibition criterion for inhibiting the pre-activation step may be a piece of information that the aircraft is on a training flight, in particular for training a pilot. In these three situations, the inhibition criterion is, for example, action on a button or on a touch screen arranged on the instrument panel of the aircraft.

The method of the invention may also include a "primed" state in which each electric machine is ready to deliver its mechanical power. To this end, at least one electric machine is started and is synchronized with the main rotor, i.e. said at least one electric machine turns at a speed of rotation making it possible to drive the main rotor substantially at its nominal speed of rotation, but without delivering power to it, by means of the use of a coupling device, typically a freewheel, between each electric machine and the main rotor. At least one electric machine then consumes a very small quantity of energy, but can, almost instantaneously, deliver mechanical power We if need be.

This primed state then includes a synchronization step for synchronizing at least one electric machine and during which the at least one electric machine is synchronized with the main rotor. The monitoring step is applied in this primed state, after the synchronization step, when at least one activation relationship is satisfied.

This primed state may be activated automatically during takeoff of the aircraft, takeoff being one of the phases that is most critical for a rotary-wing aircraft in the event of failure of the main engine. This primed state may also be activated by the pilot, e.g. via a button or indeed via a touch screen arranged on the instrument panel of the aircraft. This primed state can also be activated using one or more priming relationships equivalent to the activation relationships, but with priming thresholds greater than the activation thresholds so that the primed state is activated before at least one activation relationship is validated and before at least one electric machine delivers mechanical power to the main rotor.

In addition, this primed state may be deactivated at the end of a second predetermined lapse of time if no activation relationship is validated. This second predetermined lapse of time is, for example, equal to 3 seconds.

This primed state may also be deactivated by the pilot, e.g. via a button or indeed via a touch screen arranged on the instrument panel of the aircraft.

Furthermore, this auxiliary power We being delivered to the main rotor during the failure of the main engine of the aircraft may make it possible firstly to increase the maximum weight on takeoff of the single-engined aircraft, and secondly to increase the flight envelope of said aircraft.

The maximum weight on takeoff of a single-engined aircraft is limited by the performance of said aircraft in a flight phase in autorotation, in particular for taking into account the situation in which the engine fails during the takeoff phase. Hence, the delivery of the auxiliary power We improving the performance of the aircraft in a flight phase in autorotation can thus make it possible to increase the maximum weight on takeoff of the aircraft.

In addition, the flight envelope of the aircraft, which envelope is characterized in particular by the height-velocity diagram, may advantageously be increased by means of the delivery of said auxiliary power We improving the performance of said aircraft in a flight phase in autorotation. In particular, the area of the height-velocity diagram to be avoided can be reduced.

Furthermore, the delivery of the auxiliary mechanical power We to the main rotor can make it possible to reduce the rate of descent of the aircraft in autorotation. Consequently, the distance flyable by the aircraft in a flight phase in autorotation can be increased, and the pilot of the aircraft can more easily find an appropriate landing ground.

The invention thus advantageously makes it possible to increase the gliding area of the aircraft, also known as the "autorotation cone", in order to reach landing areas further away and therefore to improve safety in the event of autorotation following an engine failure. In addition, in the event the aircraft is flying over a town or city, the invention an enable the aircraft to continue its flight on the level in the event of an engine failure, in order to reach a landing ground further away and outside the town or city.

Furthermore, in order to limit the weight of each electric machine, and the weight of the at least one electrical energy storage device, which weights can adversely affect the performance of the aircraft, it is then necessary to limit those weights in order to obtain a compromise or trade-off between delivery of auxiliary power We and increase in the weight of the aircraft.

In addition, the time for which each electric machine is used is limited, and of the order of a few tens of seconds. Thus, the maximum auxiliary power necessary for coping safely with a failure of the main engine of the single-engined aircraft, i.e. the maximum power that can be delivered by the electric machine, is limited, and of the order of 15% to 30% of a maximum power of the main engine of the aircraft.

The hybrid power plant preferably includes a single electric machine and a single electrical energy storage device so as to limit the weight of said hybrid power plant and, consequently, the weight of the aircraft.

The steps of this method are performed by means of a computer unit of the aircraft, such as a computer, a calculator or a processor, for example, and by means of at least one memory that, in particular, stores the various thresholds used and the coefficients $k_i$ dedicated to each monitoring parameter S as well as the various activation relationships and, where applicable, the various deactivation and priming relationships used by the method, and instructions making it possible to implement the method. The computer unit or the memory may be dedicated to implementing the method or indeed may be shared with the avionics system of the aircraft.

The present invention also provides a single-engined rotary-wing aircraft including an assistance device for assisting in the event of engine failure. The aircraft preferably includes a hybrid power plant provided with a single main engine, with at least one electric machine, with at least one electrical energy storage device, and with a main gearbox, and at least one main rotor that is driven in rotation by the hybrid power plant and that turns at a speed of rotation Nr. Other provisions may also be made for the main engine not to be a fuel-burning engine, but rather for it to be replaced by an electric motor.

The assistance device for assisting in the event of engine failure includes:

the hybrid power plant;
a control device for controlling the electric machine;
a monitoring device;
a computer unit; and
a memory.

The assistance device thus makes it possible to assist a pilot of the aircraft during a flight phase in autorotation by implementing the above-described assistance method.

The monitoring device makes it possible to monitor at least one monitoring parameter S of the aircraft in order to detect any failure of the main engine. The computer unit communicates, in particular, with the monitoring device and with the control device, the control device being connected to the electric machine, so as to implement the above-described method.

The monitoring parameter S may, for example, be the power of the main rotor that drops in the event of a failure of the main engine. A preferred monitoring parameter S is the speed of rotation Nr of the main rotor.

The monitoring device then includes a measurement device in order to monitor at least one monitoring parameter S, and in particular for assessing a drop in power of the main rotor, e.g. by measuring the speed of rotation Nr.

The computer unit of the assistance device then executes instructions stored in the memory in order to implement the steps of the assistance method. The assistance device thus makes it possible to determine whether there is a failure of the main engine, and then to control the electric machine, if necessary, in order to deliver auxiliary mechanical power We to the main rotor, thereby making it possible to assist the pilot of the aircraft in performing the flight phase in autorotation, following the failure, for maneuvering the aircraft.

A storage device may, for example, include at least one rechargeable battery, at least one fuel cell, or indeed at least one supercapacitor.

BRIEF DESCRIPTION OF THE DRAWINGS

The invention and its advantages appear in greater detail from the following description of implementations and embodiments given by way of illustration with reference to the accompanying figures, in which.

DETAILED DESCRIPTION OF THE INVENTION

Elements that are present in more than one of the figures are given the same references in each of them.

Figure 1:
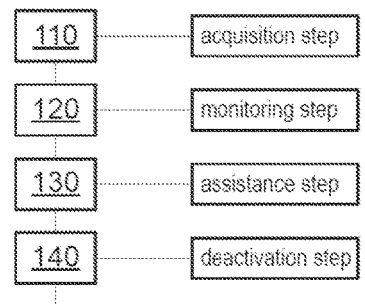
FIG. 1 is a block diagram of the method of assisting a single-engined aircraft in the event of engine failure.

FIG. 1 shows a method of assisting a single-engined rotary-wing aircraft 2 for performing a flight phase in autorotation following engine failure.

Figure 2:
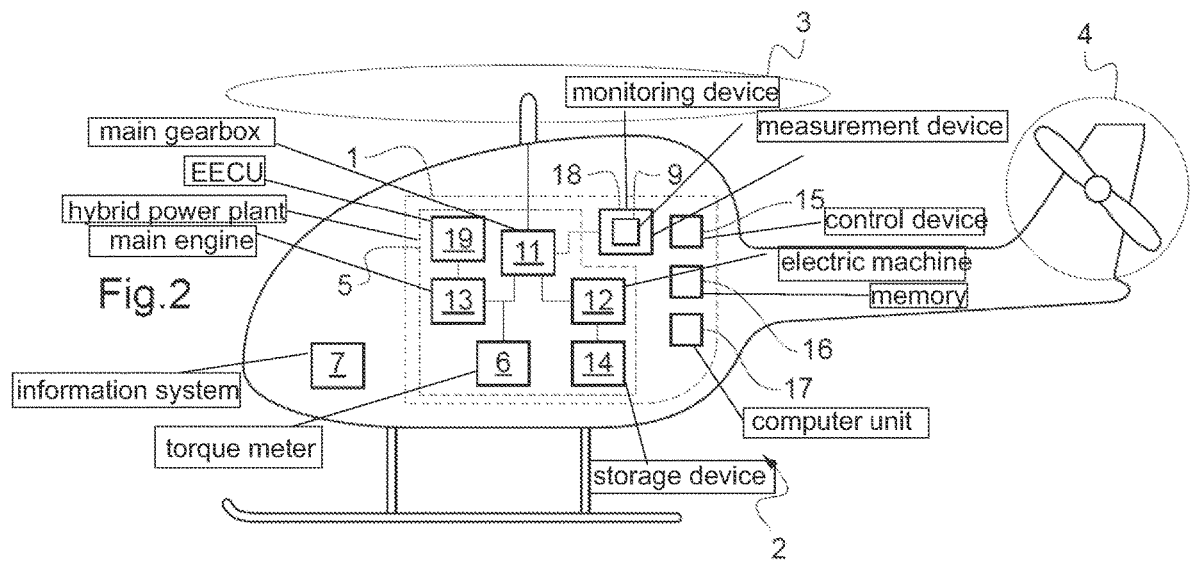
FIG. 2 shows a single-engined aircraft as equipped with an assistance device.

FIG. 2 shows a single-engined rotary-wing aircraft 2 equipped with an assistance device 1 configured to implement the method.

In the event of a failure of the main engine of the aircraft 2, the assistance method and the assistance device 1 enable the pilot to reach the flight phase in autorotation safely, and to make a landing in assisted and safe manner.

The single-engined rotary-wing aircraft, shown in FIG. 2, has a hybrid power plant 5 provided with a single main engine 13, with an electric machine 12, with a main gearbox 11, with an electrical energy storage device 14 and with an Electronic Engine Control Unit (EECU) 19 delivering the operating characteristics of the main engine 13. For example, the storage device 14 comprises a battery, a fuel cell, or indeed a supercapacitor.

The aircraft 2 also has a main rotor 3 and a tail rotor 4 that are driven in rotation by the hybrid power plant 5.

The assistance device 1 is formed by the hybrid power plant 5, by a monitoring device 18, by a control device 15 for controlling the electric machine 12, by a computer unit 17 and by a memory 16.

The function of the monitoring device 18 is to measure at least one monitoring parameter S for monitoring operation of the aircraft 2. Each monitoring parameter S makes it possible to detect the presence or indeed the imminence of a failure of the main engine 13. In the example shown in FIG. 2, the monitoring device 18 includes a measurement device 9 for measuring the instantaneous speed of rotation Nr of the main rotor 3. Below, this instantaneous speed of rotation is designated by the term "speed of rotation Nr".

More precisely, this measurement device 9 measures a speed of rotation of a gearwheel of the main gearbox 11 of the hybrid power plant 5 that drives the main rotor 3 in rotation. The gearwheel is synchronous with the main rotor 3 and has a speed of rotation significantly greater than the speed of rotation of the main rotor 3. The value of the speed of rotation of the main rotor 3 that is obtained by measuring the speed of the gearwheel of the main gearbox 11 is thus more accurate and less noisy than a direct measurement on the hub of the main rotor 3, because this speed can be computed more frequently and therefore the delay in determining the speed is shorter, thereby guaranteeing greater reactivity in detecting the failure.

The assistance device 1 is configured to implement the assistance method shown in FIG. 1. This assistance method comprises four steps 110, 120, 130, and 140.

During an acquisition step 110, at least one monitoring parameter S is monitored for in order to detect a failure of the main engine 13. Then, during a monitoring step 120, the electric machine 12 is activated when a failure of the main engine 13 is detected. Such a failure is detected by making a comparison in which at least one activation relationship containing the instantaneous values of at least one monitored-for monitoring parameter S and of its time derivative is compared with a predetermined dedicated activation threshold $\text{Threshold}_i$. Then during an assistance step 130, the electric machine 12 is controlled to deliver auxiliary mechanical power We in regulated manner to the main rotor 3, thereby making it possible to assist a pilot of the aircraft 2 during the flight phase in autorotation following said failure, for maneuvering the aircraft 2 safely, and during landing of the aircraft. Finally, during a deactivation step 140, the assistance step 130 is deactivated after a deactivation relationship containing the instantaneous values of at least one monitored-for monitoring parameter S and of its time derivative has been compared with a predetermined dedicated deactivation threshold.

During the acquisition step 110, at least one monitoring parameter S is therefore measured. In addition, the time derivative of at least one monitoring parameter S is determined by means of the computer unit 17 and by means of the successive measurements of said monitoring parameter S. This acquisition step 110 is performed throughout the assistance method of the invention, while the aircraft 2 is on the ground and while it is in flight.

A preferred monitoring parameter S is the speed of rotation Nr of the main rotor 3. The computer unit 17 makes it possible to determine the value of the speed of rotation Nr of the main rotor 3 when the measurement device 9 measures the speed of rotation of a gearwheel of the main gearbox 11 that is synchronous with the main rotor 3 using a relationship stored in the memory 16.

In addition, other monitoring parameters S may be substituted for the speed of rotation Nr of the main rotor 3. For example, a monitoring parameter S is torque at the outlet of the main engine 13 as measured by means of a torque meter 6, the value of the torque dropping rapidly when the main engine fails. Similarly, when the main engine 13 of the aircraft 2 is a turboshaft engine having a compressor turbine, a monitoring parameter S may be one of the operating characteristics of the main engine 13, such as the temperatures and the pressures of the fluids in said main engine 13 or indeed the speed of the compressor turbine in order to detect the failure of the turboshaft engine. These operating characteristics of the main engine 13 are delivered by the EECU 19.

Then, during the monitoring step 120, the computer unit 17 executes instructions stored in the memory 16 in order to determine whether there is a failure of the main engine 13 and so that the electric machine 12 is activated as soon as a failure is detected. For this purpose, the memory 16 also stores a plurality of activation relationships involving the instantaneous values of at least one monitored-for monitoring parameter S and of its time derivative, positive coefficients $k_i$ and a plurality of activation thresholds $\text{Threshold}_i$, where i is a positive integer varying in the range 1 to n and n is the number of activation relationships. Each activation relationship is then compared with an activation threshold Thresholds, and a failure of the main engine 13 is considered as being detected when at least one of the activation relationships is less than the activation threshold $\text{Threshold}_i$ corresponding to said activation relationship. The coefficients $k_i$ and the activation thresholds $\text{Threshold}_i$ are predetermined, dependent on the aircraft, and constant for any given aircraft, the activation thresholds $\text{Threshold}_i$ also being dependent on the corresponding coefficient $k_i$. In addition, these coefficients $k_i$ and these activation thresholds Threshold$_i$ are adapted to the various flight situations that the aircraft 2 can encounter.

In particular, when the monitored-for monitoring parameter S is the speed of rotation Nr of the main rotor 3, the electric machine 12 is activated when at least one inequation [Math 2] is satisfied.

In the event of a failure of the main engine 13, the speed of rotation Nr drops rapidly. In addition, this drop in the speed of rotation Nr takes place under a high deceleration, this deceleration being the time derivative of the speed of rotation Nr. By using this derivative, the deceleration in the speed of rotation Nr can be detected as soon as the instant following the failure, whereas it would be necessary to wait for the speed of rotation Nr to reach a predetermined value in order to be certain there really is a failure if the derivative were not used.

Furthermore, a single activation relationship [Math 5] may be compared with a single activation threshold Threshold during the monitoring step 120, instead of a set of a plurality of activation relationships. The coefficient k is then variable as a function of the monitoring parameter S and of its time derivative in order to cover the various flight situations, and the activation threshold Threshold is predetermined for any given aircraft.

During the assistance step 130, after detecting a failure of the main engine 13, the computer unit 17 executes instructions stored in the memory 16 so that the electric machine 12 delivers auxiliary mechanical power We to the main rotor 3, so as to assist the pilot of the aircraft 2 during the flight phase in autorotation following said failure and during landing of the aircraft 2.

During the assistance step 130, the electric machine 12 is preferably regulated so as to drive the main rotor 3 in rotation until the aircraft 2 has landed.

For example, the electric machine 12 may deliver maximum power with a limitation on the magnitude of the electric current consumed by the electric machine 12.

In another example, the electric machine 12 may deliver a first predetermined amount of auxiliary power We to the main rotor 3 for a first predetermined lapse of time for going into the phase in autorotation, and a second predetermined amount of auxiliary power We to the main rotor 3 at the time landing takes place.

In another example, the electric machine 12 may firstly deliver constant torque until it delivers auxiliary power We equal to a predetermined nominal amount of power, and then the electric machine 12 delivers said auxiliary power We so long as the speed of rotation Nr is less than a threshold value, while also complying with any limits of the electric machine 12 or of the regulation, namely the torque or the power delivered by the electric machine 12. The electric machine 12 is then regulated in order to maintain the speed of rotation Nr substantially equal to the threshold value. The threshold value is a predetermined speed of rotation of the main rotor 3, e.g. equal to the nominal speed of rotation of the main rotor 3 or indeed greater than said nominal speed of rotation.

The electric machine 12 may also be regulated by using a threshold value as the only setpoint for the speed of rotation Nr.

The electric machine 12 may also be regulated by using a setpoint on the power delivered by the electric machine 12, e.g. equal to the maximum power of the electric machine 12, while also being limited by the maximum torque of the electric machine 12.

The electric machine 12 may also be regulated by using a setpoint on the torque delivered by the electric machine 12, optionally as a function of the monitoring parameter S and of its derivative.

Furthermore, when the engine failure occurs in the proximity of the ground, rapidity of reaction is essential for avoiding a crash. In such a situation, the electric machine 12 delivers its maximum power as soon as it is activated and until the aircraft 2 has landed.

Finally, during the deactivation step 140 for deactivating the assistance step 130, the computer unit 17 executes instructions stored in the memory 16 in order to check that the monitoring parameter S used does not exceed a value greater than a maximum limit that could lead to damage to the aircraft 2 and, consequently, to stopping the delivery of the auxiliary mechanical power We by the electric machine 12. To this end, the memory 16 stores a deactivation relationship involving the instantaneous values of at least one monitored-for monitoring parameter S and optionally of its time derivative.

For example, a deactivation relationship is a comparison of a single monitoring parameter S with a deactivation threshold, the assistance step 130 being deactivated as soon as the monitoring parameter S is greater than or equal to said deactivation threshold.

A deactivation relationship may also involve a monitoring parameter S and its derivative, this deactivation relationship being different from each activation relationship used during the monitoring step 120. The deactivation relationship is then compared with a deactivation threshold Threshold$_{Max}$, the assistance step being deactivated as soon as the deactivation relationship is greater than or equal to said deactivation threshold. Such a deactivation relationship Threshold$_{Max}$ may, for example, when the monitoring parameter S is the speed of rotation Nr of the main rotor 3 be written as follows:

$$S + k' \frac{dS}{dt} \geq Threshold_{Max}. \qquad \text{[Math 7]}$$

The coefficient k' may be constant or indeed variable, e.g. it may vary as a function of the speed of rotation Nr and of its time derivative. For example, the coefficient k' may be defined as a function of a reaction time of the deactivation in order to make sure that the delay in deactivating does not lead to exceeding the defined deactivation threshold.

This deactivation step 140 thereby advantageously makes it possible to stop the delivery of the auxiliary mechanical power We and thus to save electrical energy stored in the electrical energy storage device 14 and to avoid any damage to the aircraft 2.

This deactivation step 140 may also use control by the pilot of the aircraft 2, instead of or in addition to an activation relationship in order to deactivate the assistance step 130. Such control is, for example, action on a button or on a touch screen arranged on the instrument panel of the aircraft 2.

In addition, the method of the invention may include inhibition conditions for inhibiting the monitoring step 120, thereby preventing the assistance step 130 from being performed. These inhibition conditions are, for example:
  the aircraft 2 is on the ground;
  the aircraft 2 is above a minimum height above the ground;

the aircraft 2 is on a training flight;

the undercarriage of the aircraft 2 is detected as bearing against the ground;

the height of the aircraft 2 relative to the ground as delivered, for example, by a radio altimeter is not varying and is less than or equal to a predefined height;

the speed of rotation Nr is greater than a second inhibition threshold; and the derivative of the speed of rotation Nr lies within a predetermined inhibition range.

The information indicating that the aircraft 2 is on the ground may be delivered by an information system 7 with which the aircraft 2 is provided. This information system 7 may be incorporated into the avionics system of the aircraft 2. Similarly, the information indicating an undercarriage of the aircraft 2 is on the ground is delivered by a dedicated sensor, typically connected to the avionics system of the aircraft 2.

Likewise, the method of the invention may include one or more inhibition conditions for inhibiting the deactivation step 140, thereby preventing the assistance step 130 from being stopped.

In addition, when the electrical energy storage device is a fuel cell or indeed any other electrical energy storage device requiring a non-negligible trigger time $\Delta t$ between being activated and delivery proper of electric current, said trigger time $\Delta t$ is taken into account in detecting the failure of the main engine of the aircraft 2.

In which case, the activation threshold $\text{Threshold}_i$ is, for example, replaced with a trigger threshold $\text{Threshold}'_i$ for comparison with each activation relationship [Math 1], such as:

$$\text{Threshold}'_i = \text{Threshold}_i - \frac{dS}{dt} \cdot \Delta t. \qquad \text{[Math 6]}$$

Furthermore, this auxiliary power We being delivered by the electric machine 12 to the main rotor 3 during the failure of the main engine 13 may make it possible firstly to increase the maximum weight on takeoff of a single-engined aircraft 2, and secondly to increase the flight envelope of said aircraft 2.

The maximum weight on takeoff of a single-engined aircraft 2 is limited, in particular, by the performance of said aircraft 2 in a flight phase in autorotation, in particular for taking into account the situation in which the engine fails during the takeoff phase.

Hence, the delivery of the auxiliary power We by the electric machine 12 improving the performance of the aircraft 2 in a flight phase in autorotation can thus make it possible to increase its maximum weight on takeoff.

Figure 3:
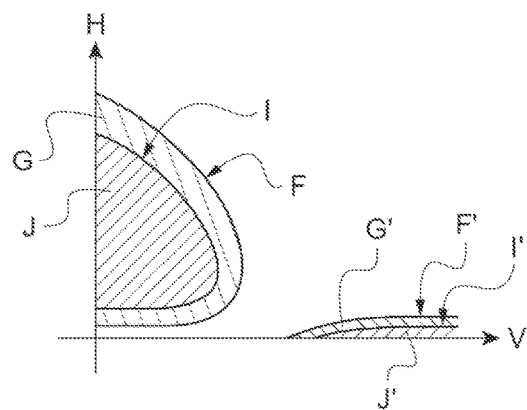
FIG. 3 is a graph showing the height-velocity diagram of an aircraft.

Furthermore, the flight envelope of the aircraft 2 is, in particular, the height-velocity diagram shown in FIG. 3 and including two curves F and F'. This height-velocity diagram determines the minimum horizontal velocity along the abscissa axis that the aircraft 2 should comply with as a function of its height above the ground up the ordinate axis. The areas G and G' of this diagram are to be avoided because the flight phase in autorotation may then not be performed safely in said areas G and G'.

Advantageously, the auxiliary power We being delivered by the electric machine 12 improving the performance of the aircraft 2 in the flight phase in autorotation makes it possible to reduce the areas G and G' to be avoided for the low velocities, which areas are replaced respectively by the areas J and J', and to achieve the height-velocity diagram formed by the curves I and I', thereby increasing the flight envelope authorized for the aircraft 2.

Figure 4:
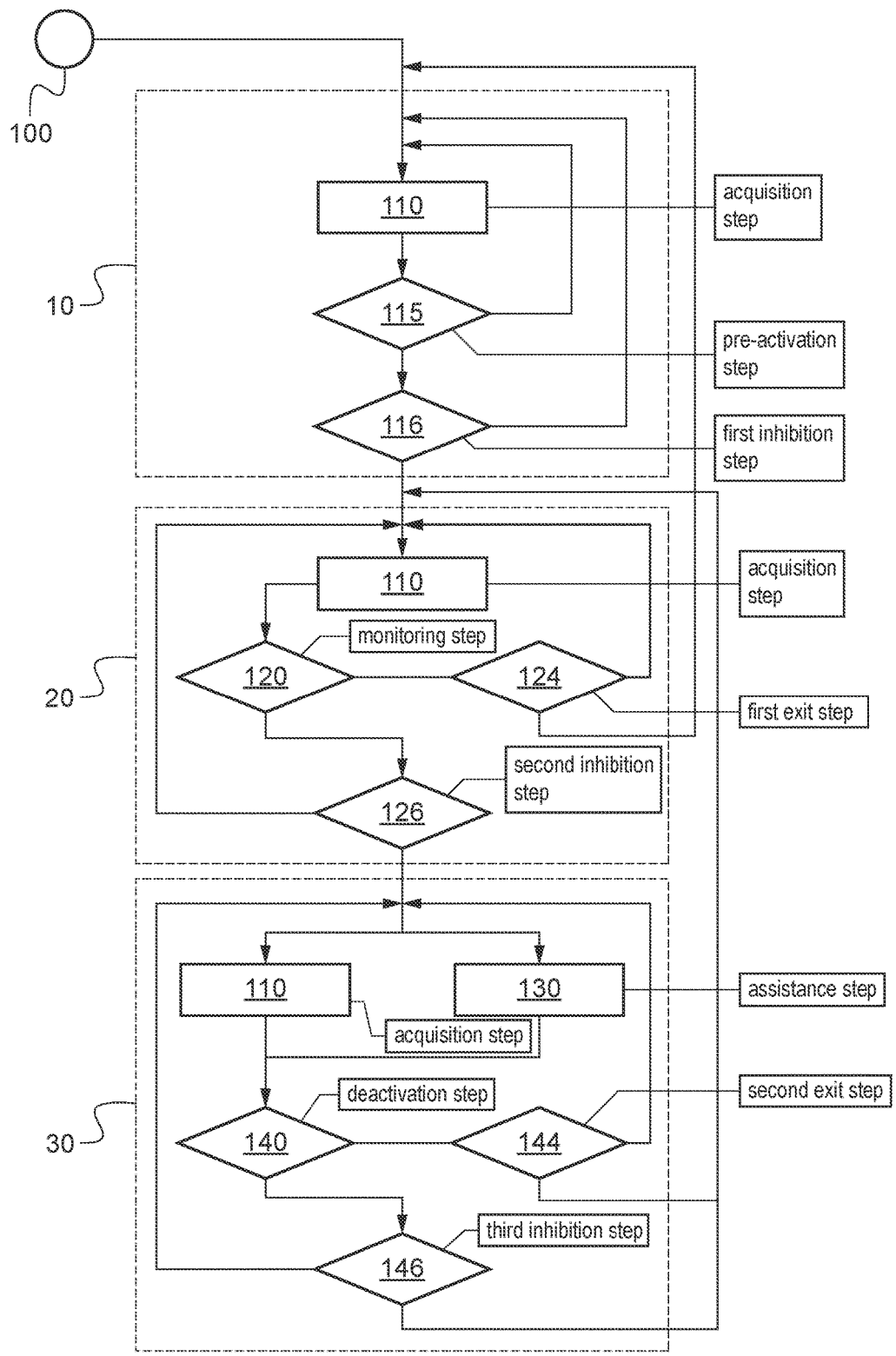
FIG. 4 is a flow chart of an assistance method.

FIG. 4 is a flow chart showing an implementation of the assistance method of the invention.

This flow chart shows three states 10, 20, and 30 of the assistance method, namely a dormant state 10, a standby state 20, and an activated state 30. The assistance method of the invention is in the dormant state 10 as soon as the aircraft 2 is started. During this dormant state 10, the monitoring step 120 cannot be activated. In the standby state 20, the monitoring step 120 can be activated when the corresponding criteria are satisfied, but the assistance step 130 cannot be activated, whereas in the activated state 30, the assistance step 130 is activated and the electric machine 12 delivers the auxiliary power We.

The acquisition step 110 is performed throughout the assistance method of the invention, during each of these three states 10, 20, and 30.

The dormant state 10 corresponds mainly to an aircraft 2 on the ground before takeoff or after landing. A pre-activation step 115 is performed in the dormant state 10, making it possible to come out of the dormant state 10 and to go into the standby state 20. A pre-activation criterion applied during this pre-activation step 115 and triggering coming out of the dormant state 10 may be associated with one or more monitoring parameters S of the aircraft 2. A pre-activation criterion is, for example, a speed of rotation Nr of the main rotor 3 greater than a pre-activation speed. The method is therefore in this dormant state 10 when the main rotor 3 is at a standstill or is turning at a speed of rotation Nr less than or equal to the pre-activation speed, provided that the method has not, prior to this, been placed in the standby state or in the activated state.

A pre-activation criterion may also be a first piece of information indicating that the aircraft 2 is no longer on the ground. The pre-activation criterion is, for example, an indication delivered by a sensor present in the undercarriage of the aircraft 2 and not detecting any bearing of the undercarriage against the ground. The pre-activation criterion may also be the value of a radio altimeter that varies, confirming that the aircraft 2 is not stationary or on the ground.

The dormant state 10 also includes a first inhibition step 116 for inhibiting the pre-activation step 115 and that applies one or more inhibition criteria in order to maintain the assistance method in the dormant state 10 and prevent it from going into the standby state 20 even though the pre-activation step 115 is validated. For example, an inhibition criterion applied during the first inhibition step 116 may be apiece of information that a maintenance operation is in progress on the aircraft 2. In such a situation, the main rotor 3 can be turning at a speed of rotation Nr greater than the pre-activation speed even though the aircraft 2 is on the ground and even though no takeoff is planned.

An inhibition criterion may also be that the aircraft has just landed and that its mission is finished. Consequently, no takeoff is planned and the method of the invention can be maintained in the dormant state 10 while the speed of rotation Nr of the main rotor 3 then decreases before the main engine is switched off.

Similarly, an inhibition criterion may be that the aircraft 2 is on a training flight, in particular for training a pilot in flying in autorotation. Such a training flight needs to be performed entirely with the assistance method in the dormant state 10 so that the pilot being trained does not benefit from the assistance of the electric machine 12. In these three situations, the inhibition criterion is, for example, action on a button or on a touch screen arranged on the instrument panel of the aircraft 2.

The standby state 20 corresponds to an aircraft 2 in flight or indeed still on the ground and in a takeoff phase. The monitoring step 120 is performed in this standby state 20 so as then to go over to the activated state 30 and then to perform the assistance step 130 as soon as a failure of the main engine 13 is detected.

The standby state 20 also includes a first exit step 124 for coming out of the standby state 20 and that applies one or more exit criteria so that the assistance method comes out of the standby state 20 and goes back into the dormant state 10. An exit criterion is involved, for example, following landing of the aircraft 2. An exit criterion is, for example the above-described first piece of information indicating that the aircraft 2 is on the ground, or else a control performed by the pilot of the aircraft 2, e.g. via a button or indeed via a touch screen arranged on the instrument panel of the aircraft 2.

The standby state 20 also includes a second inhibition step 126 for inhibiting the monitoring step 120 and that applies one or more inhibition criteria in order to maintain the assistance method in the standby state 20 and to prevent it from going into the activated state 30 even though the monitoring step 120 is validated. For example, an inhibition criterion applied during the second inhibition step 126 may be that the aircraft 2 is above a minimum height above the ground. With the monitoring parameter S used being the speed of rotation Nr of the main rotor 3, an inhibition criterion may also be that the speed of rotation Nr is greater than the second inhibition threshold, or indeed that the derivative of the speed of rotation Nr lies within a predetermined inhibition range.

If, as a result of the monitoring step 120 being performed, engine failure is detected, the method of the invention comes out of the standby state 20 and goes into the activated state 30 and performs the assistance step 130. The deactivation step 140 is also performed during the activated state 30 in order to stop the assistance step 130, if necessary, and go back into the standby state 20.

The activated state 30 also includes a second exit step 144 for coming out of the activated state 30 and that applies one or more exit criteria so that the assistance method comes out of the activated state 30 and goes back into the standby state 20. An exit criterion is, for example, control by the pilot of the aircraft 2 via a button or indeed via a touch screen arranged on the instrument panel of the aircraft 2. This action by the pilot makes it possible, in particular, to save electrical energy stored in the electrical energy storage device 14 when the pilot considers that it is no longer necessary to deliver the auxiliary mechanical power We to the main rotor 3.

The activated state 30 also includes a third inhibition step 146 for inhibiting the deactivation step 140 and that applies one or more inhibition criteria so that the assistance method does not come out of this activated state 30 and does not go back into the standby state 20, the assistance step 130 then not be stopped, even though the deactivation step 140 is validated.

For example, a deactivation relationship satisfied during the deactivation step 140 aims to protect one of the components of the aircraft 2 from damage by comparing the value of a monitoring parameter S or indeed the deactivation relationship containing the monitoring parameter S and its derivative with a deactivation threshold, while, on the contrary, the aim of an inhibition criterion applied during the third inhibition step 146 may be to authorize the monitoring parameter S or the deactivation relationship to exceed the deactivation threshold. This is because it is sometimes preferable to accept damage to one of the components of the aircraft 2 in order to prevent the aircraft 2 from crashing. An inhibition criterion is then the monitoring parameter S or indeed the deactivation relationship. The inhibition criterion may possibly require validation on the part of the pilot of the aircraft 2, e.g. via a button or indeed a touch screen arranged on the instrument panel of the aircraft 2 after emission of an alarm alerting the pilot that the monitoring parameter S or indeed the deactivation relationship was coming close to the deactivation threshold.

Typically, when the monitoring parameter S is the speed of rotation Nr of the main rotor 3, an inhibition criterion applied during the third inhibition step 146 may be authorization of an overspeed of the main rotor 3.

Figure 5:
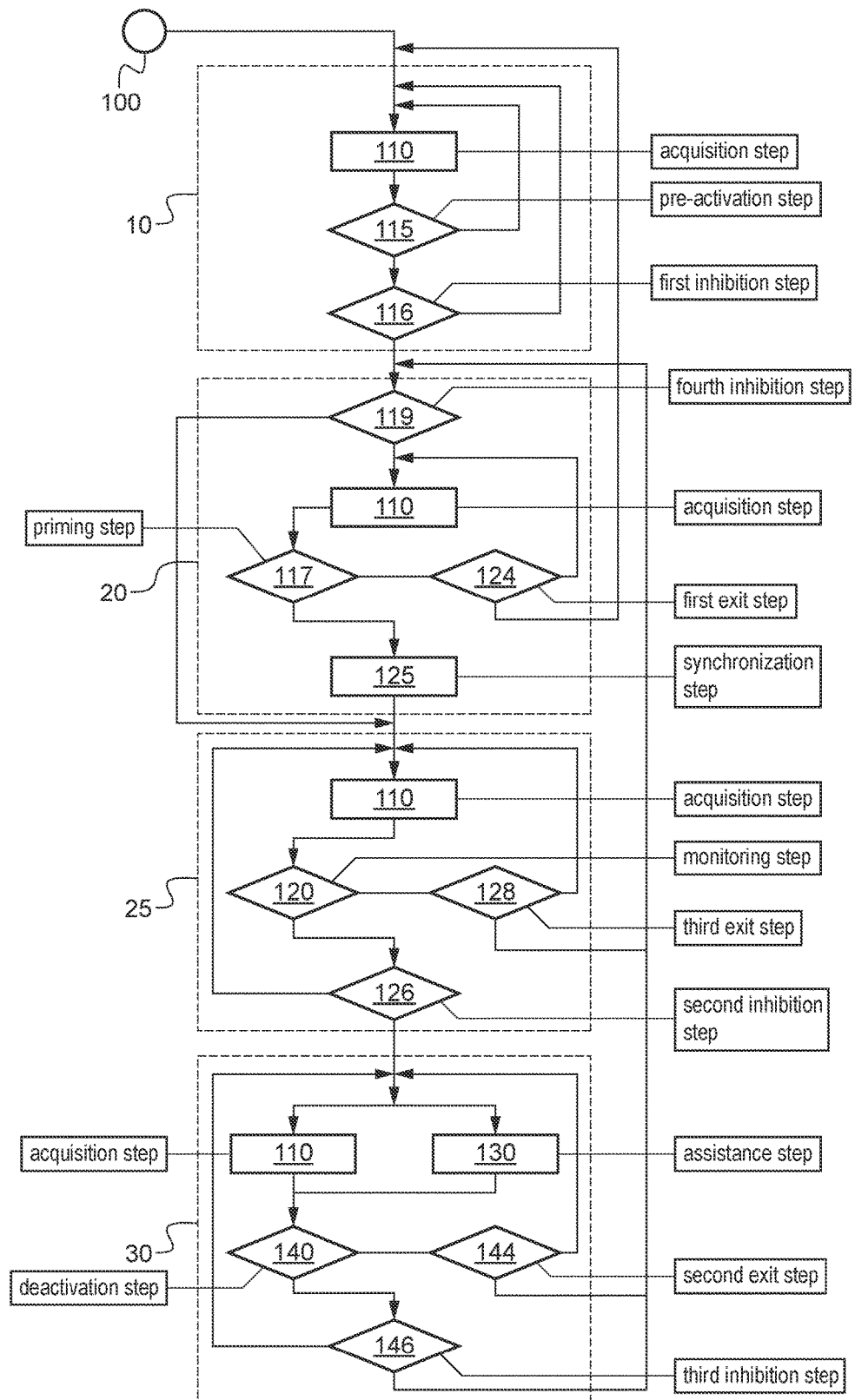
FIG. 5 is a flow chart of an assistance method.

FIG. 5 is another flow chart showing another implementation of the assistance method of the invention.

This flow chart shows four states 10, 20, 25, and 30 of the assistance method, namely a dormant state 10, a standby state 20 with priming of the electric machine 12, a primed state 25, and the activated state 30. The assistance method of the invention is in the dormant state 10 as soon as the aircraft 2 is started, this dormant state 10 being identical to the dormant state 10 of the flow chart of FIG. 4.

The acquisition step 110 is performed throughout the assistance method of the invention, during each of these four states 10, 20, 25, and 30.

As above, the standby state 20 corresponds to an aircraft 2 in flight or indeed still on the ground and in a takeoff phase. The standby state 20 includes a priming step 117 for priming the electric machine 12. This priming step 117 makes it possible, when it is validated, for the electric machine 12 to be started and ready to deliver its mechanical power We to the main rotor 3 and for the assistance method to go into the primed state 25.

To this end, the standby state 20 includes a synchronization step 125 during which the electric machine 12 is synchronized with the main rotor 3 without delivering power to it, a coupling device, typically a freewheel, then being arranged between the electric machine 12 and the main rotor 3. In this way, the electric machine 12 can then advantageously deliver the mechanical power We almost instantaneously if it is needed.

The priming step 117 applies, for example, one or more priming relationships that are equivalent to the activation relationships applied during the monitoring step 120, but with priming thresholds greater than the activation thresholds.

The priming step 117 may also be validated by the pilot of the aircraft 2, e.g. via a button or indeed a touch screen arranged on the instrument panel of the aircraft 2.

The standby state 20 includes the first exit step 124 for coming out of the standby state 20 that is identical to the first exit step of the flow chart in FIG. 4, and that applies the above-mentioned exit criterion or criteria so that the assistance method comes out of the standby state 20 and goes back into the dormant state 10.

The standby state 20 also includes a fourth inhibition step 119 for inhibiting the priming step 117.

The priming step 117 is performed with priming criteria that are more sensitive than the activation criteria, making it possible to go into the activated state 30. Therefore, in the event of turbulence, for example, fluctuations in a monitoring parameter S, in particular in the speed of rotation Nr of the main rotor 3, are possible and might cause untimely triggering of the synchronization step 125. Inhibition criteria may then be applied during the fourth inhibition step 119 in order to inhibit the priming step 117 and the synchronization step 125 so as to place the assistance method in the primed state 25, without starting the electric machine 12, and applying the monitoring step 120 for going into the activated state 30 if necessary.

The primed state 25 includes the monitoring step 120 so that the method goes into the activated state 30 if necessary. The primed state 25 also includes a third exit step 128 for coming out of the primed state 25, and an inhibition step 126 that is identical to the corresponding inhibition step of the flow chart of FIG. 4.

When the third exit step 128 is validated, the assistance method quits the primed state 25 and goes back into the standby state 20. An exit criterion applied by this third outlet step 128 is, for example, a second predetermined lapse of time at the end of which the primed state is deactivated, the assistance method going back into the standby state 20. Another exit criterion may be control by the pilot of the aircraft 2, e.g. via a button or indeed via a touch screen arranged on the instrument panel of the aircraft 2.

If, as a result of the monitoring step 120 being performed, engine failure is detected, the assistance method comes out of the primed state 25 and goes into the activated state 30 and performs the assistance step 130.

The activated state 30 is identical to the activated state in the flow chart of FIG. 4. In particular, the deactivation step 140 is also performed during the activated state 30 in order to stop the assistance step 130 and go back into the standby state 20.

Naturally, the present invention can be the subject of numerous variants as to its implementation. Although several embodiments and implementations are described, it should readily be understood that it is not conceivable to identify exhaustively all possible embodiments and implementations. It is naturally possible to envisage replacing any of the means described by equivalent means without going beyond the ambit of the present invention.

What is claimed is:

1. An assistance method for assisting a single-engined rotary-wing aircraft in the event of engine failure, the aircraft including:
   a hybrid power plant provided with a single main engine, with at least one electric machine, with a main gearbox and with at least one electrical energy storage device; and
   at least one main rotor driven in rotation by the power plant;
   the assistance method including the following steps:
   an acquisition step for acquiring at least one monitoring parameter S for monitoring the aircraft in order to detect any failure of the main engine;
   at least one monitoring step for activating at least one electric machine when at least one activation relationship containing instantaneous values of at least one monitoring parameter S and of its time derivative is less than a dedicated activation threshold $Threshold_i$, $$S + k_i \frac{dS}{dt} < Threshold_i,$$

where i is a positive integer varying from 1 to n, where n is a positive integer greater than or equal to 1, and where $Threshold_i$ is an activation threshold;

an assistance step for assisting in flying the aircraft, the at least one electric machine delivering auxiliary mechanical power We to the main rotor, thereby making it possible to assist a pilot of the aircraft, during a flight phase following the failure, in maneuvering the aircraft; and a deactivation step for deactivating the assistance step to stop delivering auxiliary mechanical power We to the main rotor;

wherein the method uses a single activation relationship $$S + k \frac{dS}{dt} < Threshold,$$

where $$\frac{dS}{dt}$$

is the derivative of the parameter S, Threshold is an activation threshold, and k is a positive coefficient that varies as a function of the monitoring parameter S and of the derivative, the activation threshold Threshold and the coefficient k being dependent on the aircraft.

2. The method according to claim 1,
wherein a monitoring parameter of the aircraft is a speed of rotation Nr of the main rotor.

3. The method according to claim 2,
wherein the speed of rotation Nr is determined following a measurement of a speed of rotation of a gearwheel of main gearbox, the gearwheel being synchronous with the main rotor.

4. The method according to claim 1,
wherein the method includes at least one inhibition condition for inhibiting monitoring step, thereby preventing the assistance step from being performed.

5. The method according to claim 4,
wherein the at least one inhibition condition is chosen from among the following list:
   the aircraft is on the ground;
   aircraft is above a minimum height above the ground;
   the aircraft is on a training flight;
   an undercarriage of the aircraft is detected as bearing against the ground;
   the height of the aircraft relative to the ground is not varying and is less than or equal to a predefined height;
   a monitoring parameter S is less than a first inhibition threshold;
   a monitoring parameter S is greater than a second inhibition threshold; and
   the derivative of a monitoring parameter S lies within a predetermined inhibition range.

6. The method according to claim 1,
wherein the deactivation step applies a deactivation relationship that involves at least one monitoring parameter S and optionally its derivative.

7. The method according to claim 1,
wherein the method includes at least one inhibition condition for inhibiting the deactivation step, thereby preventing assistance step from being stopped.

8. The method according to claim 1,
wherein the method includes at least one pre-activation step for pre-activating the assistance method and at least one inhibition condition for inhibiting the pre-activation step.

9. The method according to claim 8,
wherein the method includes a dormant state, a standby state, and an activated state, the method being in dormant state as soon as the aircraft is started, it not being possible for the monitoring step to be performed during the dormant state it not being possible for the assistance step to be activated during the standby state, the assistance step being activated during the activated state, the dormant state including the pre-activation step and a first inhibition step for inhibiting the pre-activation step, the standby state including the monitoring step, a first exit step for coming out of the standby state, and a second inhibition step for inhibiting the monitoring step, the activated state including the assistance step, the deactivation step, a second exit step for coming out of the activated state, and a third inhibition step for inhibiting the deactivation step, the dormant state, the standby state and the activated state including the acquisition step.

10. The method according to claim 1,
wherein the method includes a synchronization step for synchronizing the at least one electric machine, during which synchronization step the at least one electric machine is synchronized with the main rotor, without delivering power to it.

11. The method according to claim 1,
wherein the at least one activation threshold $Threshold_i$ is replaced with a trigger threshold $Threshold'_i$ taking into account a trigger time $\Delta t$ for triggering the at least one electrical energy storage device such as:

$$Threshold'_i = Threshold_i - \frac{dS}{dt} \cdot \Delta t.$$

12. The method according to claim 1,
wherein, during the assistance step, the at least one electric machine is regulated so as to drive the main rotor in rotation until the aircraft is landed.

13. The method according to claim 1,
wherein, during the assistance step, the at least one electric machine delivers maximum power with a limitation on the electric current consumed by the at least one electric machine.

14. The method according to claim 1,
wherein, during the assistance step, the at least one electric machine delivers a first predetermined amount of power to the main rotor during a first predetermined lapse of time and a second predetermined amount of power to the main rotor for landing the aircraft.

15. The method according to claim 1,
wherein, during the assistance step, the at least one electric machine firstly delivers constant torque until it delivers auxiliary power We equal to a predetermined nominal amount of power, then the at least one electric machine delivers auxiliary power We equal to a predetermined nominal amount of power until at least one monitoring parameter S reaches a threshold value, the at least one electric machine then being regulated to maintain the at least one monitoring parameter S equal to the threshold value.

16. The method according to claim 1,
wherein, during the assistance step, the at least one electric machine firstly delivers constant torque until it delivers auxiliary power We equal to a predetermined nominal amount of power of the at least one electric machine, then the at least one electric machine delivers auxiliary power We equal to the predetermined nominal amount of power until at least one monitoring parameter S reaches a threshold value, the at least one electric machine then being regulated to maintain the at least one monitoring parameter S equal to the threshold value.

17. The method according to claim 1,
wherein, during the assistance step, the at least one electric machine is regulated so that the at least one electric machine delivers auxiliary power We equal to a maximum amount of power of the at least one electric machine, while also limiting the auxiliary power We by the maximum torque of the at least one electric machine.

18. The method according to claim 1,
wherein, during the assistance step, the at least one electric machine is regulated so as to maintain at least one monitoring parameter S equal to a threshold value.

19. An assistance method for assisting a single-engined rotary-wing aircraft in the event of engine failure, the aircraft including:
a hybrid power plant provided with a single main engine, with at least one electric machine, with a main gearbox and with at least one electrical energy storage device; and
at least one main rotor driven in rotation by the power plant;
the assistance method including the following steps:
an acquisition step for acquiring at least one monitoring parameter S for monitoring the aircraft in order to detect any failure of the main engine;
at least one monitoring step or activating at least one electric machine when at least one activation relationship containing instantaneous values of at least one monitoring parameter S and of its time derivative is less than a dedicated activation threshold $Threshold_i$, $$S + k_i \frac{dS}{dt} < Threshold_i,$$

where i is a positive integer varying from 1 to n, where n is a positive integer greater than or equal to 1, and where $Threshold_i$ is an activation threshold;
an assistance step for assisting in flying the aircraft, the at least one electric machine delivering auxiliary mechanical power We to the main rotor, thereby making it possible to assist a pilot of the aircraft, during a flight phase following the failure, in maneuvering the aircraft; and
a deactivation step for deactivating the assistance step to stop delivering auxiliary mechanical power We to the main rotor;
at least one pre-activation step for pre-activating the assistance method and at least one inhibition condition for inhibiting the pre-activation step
wherein the method includes a dormant state, a standby state, a primed state and an activated state, the method being in the dormant state as soon as the aircraft is started, it not being possible for the monitoring step to be performed during the dormant state or during the standby state, it not being possible for the assistance step to be activated during the primed state, the assistance step being activated during the activated state, the dormant state including the pre-activation step and a first inhibition step for inhibiting the pre-activation step, the standby state including a priming step for priming the at least one electric machine, a synchronization step for synchronizing the at least one electric machine, a first exit step for coming out of the standby state, and a fourth inhibition step for inhibiting the priming step and for inhibiting the synchronization step, the primed state including the monitoring step, a third exit step for coming out of the primed state, and a second inhibition step for inhibiting the monitoring step, the activated state including the assistance step, the deactivation step, a second exit step for coming out of the activated state and, a third inhibition step for inhibiting the deactivation step, the dormant state, the standby state, the primed state, and the activated state including the acquisition step.

20. A rotary-wing aircraft including:
a hybrid power plant provided with a single main engine, with at least one electric machine, with at least one electrical energy storage device, and with a main gearbox;
at least one main rotor driven in rotation by the power plant and turning at a speed of rotation Nr; and
an assistance device for assisting in the event of failure of the main engine, which assistance device includes:
the hybrid power plant;
a control device for controlling the electric machine;
a monitoring device;
a computer unit; and
a memory;
wherein the assistance device is configured to assist a pilot of the aircraft during a flight phase in autorotation,
the monitoring device acquires at least one monitoring parameter S for monitoring the aircraft in order to detect any failure of the main engine;
at least one electric machine is activated when at least one activation relationship containing instantaneous values of at least one monitoring parameter S and of its time derivative is less than a dedicated activation threshold Threshold$_i$, $$S + k_i \frac{dS}{dt} < \text{Threshold}_i,$$

where i is a positive integer varying from 1 to n, where n is a positive integer greater than or equal to 1, and where Threshold$_i$ is an activation threshold; and
the aircraft is assisted in flying with the at least one electric machine delivering auxiliary mechanical power We to the main rotor thereby making it possible to assist a pilot of the aircraft, during a flight phase following the failure, in maneuvering the aircraft,
wherein the at least one activation relationship includes a single activation relationship $$S + k \frac{dS}{dt} < \text{Threshold},$$

where $$\frac{dS}{dt}$$

is the derivative of the parameter S, Threshold is an activation threshold, and k is a positive coefficient that varies as a function of the monitoring parameter S and of the derivative, the activation threshold Threshold and the coefficient k being dependent on the aircraft.

21. The aircraft according to claim 20,
wherein the monitoring device includes a measurement device for assessing a drop in power on the main rotor.

22. The aircraft according to claim 20,
wherein the monitoring device includes a measurement device for measuring the speed of rotation Nr.

23. A rotary-wing aircraft including:
a hybrid power plant provided with a single main engine, with at least one electric machine, with at least one electrical energy storage device, and with a main gearbox;
at least one main rotor drivable in rotation by the power plant at a speed of rotation Nr; and
an assistance device for assisting in the event of failure of the main engine, which assistance device includes:
the hybrid power plant;
a control device for controlling the electric machine;
a monitoring device;
a computer unit; and
a memory;
wherein the assistance device is configured to assist a pilot of the aircraft during a flight phase in autorotation,
the monitoring device is configured to acquire at least one monitoring parameter S for monitoring the aircraft in order to detect any failure of the main engine;
at least one electric machine is configured to be activated when at least one activation relationship containing instantaneous values of at least one monitoring parameter S and of its time derivative is less than a dedicated activation threshold Threshold$_i$, $$S + k_i \frac{dS}{dt} < \text{Threshold}_i,$$

where i is a positive integer varying from 1 to n, where n is a positive integer greater than or equal to 1, and where Threshold$_i$ is an activation threshold; and
the aircraft is configured to be assisted in flying by the at least one electric machine delivering auxiliary mechanical power We to the main rotor, thereby making it possible to assist a pilot of the aircraft, during a flight phase following the failure, in maneuvering the aircraft,
wherein the aircraft is configured to generate at least one inhibition condition to inhibit pre-activating the aircraft before the monitoring of the aircraft,
the aircraft configured to include a dormant state, a standby state, a primed state and an activated state, the aircraft being configured to be in the dormant state as soon as the aircraft is started, it not being possible for the monitoring to be performed during the dormant state or during the standby state, it not being possible for the aircraft to be assisted in flying during the primed state, it being possible for the aircraft to be assisted in flying during the activated state, it being possible for the aircraft to receive the least one inhibition condition to pre-activate the aircraft in the dormant state, it being possible for the at least one electric machine to be primed and synchronized in the standby state, it being possible for the aircraft to come out of the standby state and inhibit the at least one electric machine from being priming and synchronized, it being possible for the aircraft to me monitored in the primed state as well as coming out of the primed state and inhibiting the monitoring of the aircraft in the primed state, it being possible for the aircraft to be assisted in flying in the activated state, it being possible to pre-activate the aircraft in the activated state, and it being possible to come out of the activated state, the monitoring device is configured to monitor the aircraft in the dormant state, the standby state, the primed state, and the activated state.

* * * * *